US010981828B2

(12) United States Patent
Gong et al.

(10) Patent No.: US 10,981,828 B2
(45) Date of Patent: Apr. 20, 2021

(54) HIGH STRENGTH CLASS C FLY ASH CEMENTITIOUS COMPOSITIONS WITH CONTROLLABLE SETTING

(71) Applicant: The Catholic University of America, Washington, DC (US)

(72) Inventors: Weiliang Gong, Rockville, MD (US); Hui Xu, Rockville, MD (US); Werner Lutze, Chevy Chase, MD (US); Ian L. Pegg, Alexandria, VA (US)

(73) Assignee: The Catholic University of America, Washington, DC (US)

( * ) Notice: Subject to any disclaimer, the term of this patent is extended or adjusted under 35 U.S.C. 154(b) by 16 days.

(21) Appl. No.: 16/545,012

(22) Filed: Aug. 20, 2019

(65) Prior Publication Data

US 2020/0062645 A1 Feb. 27, 2020

Related U.S. Application Data

(60) Provisional application No. 62/721,021, filed on Aug. 22, 2018.

(51) Int. Cl.
| | |
|---|---|
| *C04B 18/08* | (2006.01) |
| *C04B 7/06* | (2006.01) |
| *C04B 12/00* | (2006.01) |
| *C04B 14/26* | (2006.01) |
| *C04B 18/06* | (2006.01) |
| *C04B 18/16* | (2006.01) |
| *C04B 14/36* | (2006.01) |

(52) U.S. Cl.
CPC ............... *C04B 18/08* (2013.01); *C04B 7/06* (2013.01); *C04B 12/005* (2013.01); *C04B 14/26* (2013.01); *C04B 14/366* (2013.01); *C04B 18/067* (2013.01); *C04B 18/162* (2013.01); *C04B 2201/52* (2013.01)

(58) Field of Classification Search
CPC .. C04B 7/06; C04B 7/26; C04B 7/243; C04B 12/005; C04B 14/06; C04B 14/26; C04B 14/366; C04B 18/067; C04B 18/08; C04B 18/162; C04B 22/10; C04B 22/16; C04B 22/062; C04B 22/064; C04B 22/147; C04B 28/021; C04B 40/0067; C04B 2103/0088; C04B 2201/52
See application file for complete search history.

(56) References Cited

U.S. PATENT DOCUMENTS

| | | | |
|---|---|---|---|
| 4,997,484 A | 3/1991 | Gravitt et al. | |
| 6,682,595 B1 | 1/2004 | Barbour | |
| 8,795,428 B1 * | 8/2014 | Hill | ......................... C04B 38/02 |
| | | | 106/705 |
| 2009/0013907 A1 | 1/2009 | Boxley et al. | |
| 2014/0264140 A1 | 9/2014 | Gong et al. | |
| 2017/0096367 A1 * | 4/2017 | Turpin, Jr. | ............... C04B 24/04 |

FOREIGN PATENT DOCUMENTS

| | | | | |
|---|---|---|---|---|
| CA | 2913306 A1 * | 5/2017 | ............. | C04B 28/06 |
| CN | 102850017 A * | 1/2013 | | |
| CN | 104291740 A * | 1/2015 | | |
| CN | 108059431 A * | 5/2018 | | |
| JP | 104591563 A | 5/2015 | | |
| WO | WO-2019161460 A1 * | 8/2019 | ............. | C04B 28/02 |

OTHER PUBLICATIONS

Michael Berry, Jeffy Stephens, and Doug Cross, Performance of 100% Fly Ash Concrete with Recycled Glass Aggregate; ACI Materials Journal, Technical Paper (2011) 379-384.
E.I. Diaz, E.N. Allouche, S. Eklund, Factors effecting the suitability of fly ash as source materials for geopolymers, Fuel 89 (2010) 992-996.
E. Ivan Diaz-Loya, Erez N. Allouche, and Saiprasad Vaidya, Mechanical Properties of Fly-Ash-Based Geopolymer Concrete, ACI Materials Journal (2011) 301-306.
Goril Moschner, Barbara Lothenbach, Renato Figi, Ruben Kretzschmar, Influence of citric acid on the hydration of Portland cement, Cement and Concrete Research 39 (2009) 275-282.
Alaa M. Rashad, A comprehensive overview about the influence of different admixtures and additives on the properties of alkali-activated fly ash, Materials and Design 53 (2014) 1005-1025.
J. L. Provis and S.A. Bernal, Geopolymers and Related Alkali-Activated Materials, Annual Review in Materials Research 44 (2014) 299-327.
J.L. Provis, J.S.J. van Deventer, Alkali Activated Materials; Springer: Houten, The Netherlands, (2014).
C. Roskos, D. Cross, M. Berry, J. Stephens, Identification and verification of self-cementing fly ash binders for 'Green' concrete (2011 World of Coal Ash (WOCA) Conference, May 9-12, 2011 in Denver, CO, USA).
V.S. Ramachandran, M.S. Lowery, Conduction calorimetric investigation of the effect of retarders on the hydration of Portland cement, Thermochim. Acta 195 (1992) 373-387.
C.L. Nicholson, B.J. Murray, R.A. Fletcher, D. Brew, K.J. Mackenzie, M. Schmücke, Novel geopolymer materials containing borate structural units. In Proceedings of the World Congress Geopolymer, Perth, Australia, Sep. 2005, 31-33.
International Search Report and Written Opinion received in International Application No. PCT/IB2019/057051 dated Jan. 3, 2020.

* cited by examiner

*Primary Examiner* — Anthony J Green
(74) *Attorney, Agent, or Firm* — Ajay A. Jagtiani; Miles & Stockbridge P.C.

(57) ABSTRACT

An embodiment includes a Class C fly ash (CFA) cementitious composition with a controllable setting time comprising at least one Class C fly ash; at least one alkali hydroxide; at least one source of phosphate; and water. Alternate embodiments include a Class C fly ash (CFA) cementitious composition with a solid activator comprising at least one Class C fly ash; at least one alkali carbonate; at least one source of phosphate; and water.

24 Claims, No Drawings

HIGH STRENGTH CLASS C FLY ASH CEMENTITIOUS COMPOSITIONS WITH CONTROLLABLE SETTING

This application claims benefit of priority of U.S. Patent Application No. 62/721,021 entitled, "HIGH STRENGTH CLASS C FLY ASH CEMENTITIOUS COMPOSITIONS WITH CONTROLLABLE SETTING," filed Aug. 22, 2018. The entire contents and disclosures of this patent application is incorporated herein by reference in its entirety.

BACKGROUND

Field of the Invention

The present disclosure relates generally to set controlled Class C fly ash cement. More specifically, the present disclosure relates to specialized mortar and concrete for construction, building and oil industries.

Background of the Invention

Prior art embodiments reported that borates added to alkali-silicate activated Class C fly ash (CFA) cement did not influence the setting behavior; conversely, the strength of the binders was negatively affected by a high amount of borates. The retarding agents disclosed in the prior art are in general not effective in extending set time or workable time in the alkali silicate-free CFA cementitious mixtures. Most of the CFA cementitious compositions disclosed in the prior art exhibit fast setting and rapid gaining in strength. Due to extremely short set times, or very limited workable time, the CFA cementitious compositions disclosed in the prior art cannot be used in most construction and building applications such as ready mix concrete. Therefore, there is an immediate need for the development of an effective retarding agent for CFA based cementitious compositions to offset the accelerating effect of high ambient temperature (hot weather) and keep the concrete workable throughout the entire transport, placing and finishing periods.

SUMMARY

According to first broad aspect, the present disclosure provides a Class C fly ash (CFA) cementitious composition with a controllable setting time comprising: at least one Class C fly ash; at least one alkali hydroxide; at least one source of phosphate; and water.

According to a second broad aspect, the present disclosure provides a fly ash mortar or concrete made by mixing a Class C fly ash (CFA) cementitious composition with a controllable setting time comprising: at least one Class C fly ash; at least one alkali hydroxide; at least one source of phosphate; and water, wherein, the CFA cementitious composition further comprises a second pozzolanic material, wherein the pozzolanic material is selected from the group: Class F fly ash, ground granulated blast furnace slag, superfine blast furnace slag, vitreous calcium aluminosilicate, cement kiln dust, and combinations thereof, wherein the second pozzolanic material replaces the Class C fly ash for up to 40 wt. %, wherein the at least one alkali hydroxide, the at least one source of phosphate and the at least one alkali salt are dissolved in water to form an activator solution.

According to a third broad aspect, the present disclosure provides a Class C fly ash (CFA) cementitious composition with a solid activator comprising: at least one Class C fly ash; at least one alkali carbonate; at least one source of phosphate; and water.

DETAILED DESCRIPTION OF THE INVENTION

Definitions

Where the definition of terms departs from the commonly used meaning of the term, applicant intends to utilize the definitions provided below, unless specifically indicated.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

For purposes of the present disclosure, the term "comprising", the term "having", the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "actual temperature" refers to the actual temperature of the air in any particular place, as measured by a thermometer.

For purposes of the present disclosure, the term "BWOB" refers "by weight of binder" which is generally recognized as the amount (in percent) of a material added to cement when the material is added based on the total amount of a specific binder or the blend of binders. In the case of geopolymeric materials, binders are typically pozzolanic materials called pozzolanic precursor which can be activated by alkaline solutions.

For purposes of the present disclosure, the term "cement" refers to a binder, a substance used for construction that sets, hardens, and adheres to other materials to bind them together. Seldom used on its own, cement may be utilized to bind sand and gravel (aggregate) together. Cement mixed with fine aggregate produces mortar for masonry, or with sand and gravel, produces concrete. Cements used in construction are usually inorganic, often lime or calcium silicate based, and can be characterized as either hydraulic or non-hydraulic, depending on the ability of the cement to hydrate in the presence of water.

For purposes of the present disclosure, the term "concrete" refers to a heavy, rough building material made from a mixture of broken stone or gravel, sand, cementing material, and water, that can be spread or poured into molds and that forms a stone-like mass on hardening. Some embodiments may include a composite material composed of fine and coarse aggregate bonded together with a fluid cement (cement paste) that hardens over time. Most frequently Portland cement may be utilized but sometimes other hydraulic cements may be used, such as a calcium aluminate cement. Geopolymers are considered to be a new type of cementing materials without Portland cement.

For purposes of the present disclosure, the term "geopolymer" refers to sustainable cementing binder systems without Portland cement. In a narrow term, geopolymers of the disclosed invention are related to inorganic polymers with a three-dimensional network structure similar to those of organic thermoset polymers. The backbone matrix of the disclosed geopolymers is an X-ray amorphous analogue of the framework of zeolites, featuring tetrahedral coordination of Si and Al atoms linked by oxygen bridges, with alkali metal cations (typically $Na^+$ and/or $K^+$) associated as charge balancers for $AlO_4^-$. Geopolymers of the disclosed invention may be more widely regarded as a class of alkali-activated materials (AAM) composed up of alkali-aluminosilicate and/or alkali-alkali earth-aluminosilicate phases, as a result of the reaction of an solid aluminosilicate powder (term pozzolanic precursor) with an alkali activator.

For purposes of the present disclosure, the term "geopolymer composition" refers to a mix proportion consisting of pozzolanic precursors and alkali activator in solid or liquid form. Additionally, a geopolymer composition may further include fine and coarse aggregate, fibers and other admixtures depending on the application.

For purposes of the present disclosure, the term "mortar" refers to a workable paste containing fine aggregate used to bind building blocks such as stones, bricks, and concrete masonry units together, fill and seal the irregular gaps between them, and sometimes add decorative colors or patterns in masonry walls. In its broadest sense mortar includes pitch, asphalt, and soft mud or clay, such as used between mud bricks. Cement or geopolymer mortar becomes hard when it cures, resulting into a rigid structure.

For purposes of the present disclosure, the term "room temperature" refers to a temperature of from about 15° C. (59° F.) to 25° C. (77° F.).

For purposes of the present disclosure, the term "setting" refers to conversion of a plastic paste into a non-plastic and rigid mass.

For purposes of the present disclosure, the term "set time" or "setting time" refers to the time elapsed between the moment water (alkali activator solution) is added to the cement (pozzolanic precursor) to the time at which paste starts losing its plasticity (initial setting). Final setting time is the time elapsed between the moment the water (alkali activator solution) is added to the cement (pozzolanic precursor) to the time at which the paste has completely lost its plasticity and attained sufficient firmness to resist certain definite pressure.

For purposes of the present disclosure, the term "sparingly soluble in water" refers to a substance having a solubility of 0.1 g per 100 ml of water to 1 g per 100 ml of water. Unless specified otherwise, the term "sparingly soluble" and "sparingly soluble in water" are used interchangeably in the description of the invention below to refer to substances that are sparingly soluble in water.

For purposes of the present disclosure, the term "water insoluble" refers to a substance that has a solubility of less than 0.1 g per 100 ml of water.

DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

Approximately 7 billion cubic yards of concrete are produced per year, making it the second most consumed substance on earth (next to water). About 4,200 million metric tons of Portland cement is manufactured worldwide, with an increase of 2.5% annually. Production of Portland cement is an energy intensive process where limestone and clays are mined, crushed and heated to high temperatures in excess of 1500° C. In this process, $CO_2$ is emitted from both fuel combustion and calcination of clays and de-carbonation of limestone. An average of 927 kg of $CO_2$ is emitted for every 1000 kg of Portland cement (PC) produced. About 7 percent of the world's total $CO_2$ emissions come from manufacturing Portland cement. Using "green materials" in concrete instead of Portland cement will help mitigate concrete's adverse effect on the environment.

Fly ash is a finely divided amorphous alumino-silicate substance with varying amounts of calcium that "flies up" from the coal combustion chamber (boiler) and is captured by emission control devices, such as an electrostatic precipitator or fabric filter "baghouse," and scrubbers. Over one billion tons of fly ash is produced annually worldwide in coal-burning power plants. A fraction of this fly ash is blended with Portland cement to manufacture concrete products, and about 65% of the fly ash produced is disposed of in landfills or ash ponds. The American Society for Testing and Materials (ASTM) C618 standard recognizes two major classes of fly ashes, Class C and Class F. The lower limit of ($SiO_2+Al_2O_3+Fe_2O_3$) for Class F fly ash (FFA) is 70 wt. % and that for Class C fly ash (CFA) it is 50 wt. %. The burning of anthracite and bituminous coal typically produces Class F fly ash and usually contains less than 15 wt. % CaO. Class C fly ashes typically have a high calcium oxide content (e.g., 15 to 40 wt. %). Recently, use of lignite and subbituminous coal has substantially increased and a significant percentage of the coal reserves in the US produce Class C fly ash that contains considerable amounts of CaO.

To reduce the increase of PC-related $CO_2$ emissions, fly ash may be recycled by using it as a supplementary cementitious material (SCM) in the production of Portland cement concrete. Fly ash has been used in concrete at levels ranging from 15% to 25% by mass of the cementitious material component. Higher levels (30% to 50%) have been used in massive structures (for example, foundations and dams) to limit temperature rise during curing. Class F Fly ash when used in conjunction with Portland cement improves certain durability of the hardened concrete such as limiting expansion due to alkali-silica reaction, increase in sulfate resistance and reduction in chloride permeability. However, excessive amounts of magnesia (MgO) or free lime (CaO) in Class C fly ash materials may cause unsoundness (undesirable volume change) when these materials are used in concrete and therefore, blending with Class C fly ash usually does not inherit such durability benefits. Increasing the amount of fly ash in Portland cement concrete is not without shortcomings. At high replacement levels, problems may be encountered with extended set times, and slow strength development, resulting in low early-age strengths. Also, the durability of the concrete may be compromised with regard to resistance to deicer-salt, scaling, and carbonation.

A more ecologically friendly way to use fly ash is to eliminate Portland cement completely and make a geopolymer cement or concrete through alkali-activation.[1,2] In this way the carbon dioxide emission is only a small fraction that of making Portland cement. Alkali activation is a chemical process in which an aluminosilicate material such as fly ash, metakaolin, blast furnace slag, or mixtures thereof is mixed with an alkaline silicate activator to yield a paste that sets and hardens in a short period of time.[3] The setting times of fly ash based geopolymers decrease exponentially as the CaO content increases and in contrast, compressive strength increases with increasing.[4] Alkali silicate activated CFA usually sets within 36 minutes and flash set is very common, e.g., a few minutes.[5] Unfortunately, an effective retarder is currently not available to appropriately control setting of alkali-silicate activated CFA materials to manufacture useful construction products.

Class C fly ashes display self-cementing behavior by reacting with water to produce hydrates in the absence of a source of calcium hydroxide, leading to the formation of calcium silicate and calcium aluminate hydrates. Researchers at Montana State University, USA have studied 100% Class C fly ash concrete to maximize beneficial use of waste products.[6] 100% fly ash concretes with Class C fly ashes from 16 power plants in the USA have been studied.[7] Without use of a strength accelerator, 28-day compressive strengths for the 100% fly ash concretes were generally low and varied greatly from fly ash to fly ash, e.g., from about 700 psi to less than 4000 psi.[7] Setting of a 100% Class C fly ash mixture is usually extremely fast and an efficient retarder must be included to achieve a suitable working time for industrial applications.

Certain pozzolanic materials that exhibit an insignificant extent of self-cementing may be included in CFA cementitious compositions. Examples of such pozzolanic materials include ground granulated blast furnace slag (GGBFS), high-Ca Class F fly ash, vitreous calcium aluminosilicate (VCAS) and cement kiln duct (CKD). Hydration of these pozzolanic materials may yield certain calcium silicate hydrate (CSH) and calcium aluminosilicate hydrate (CASH) gels. GGBFS is mainly a glassy aluminosilicate powder that is rich in alkali-earth oxides such as CaO, typically containing 27-38% $SiO_2$, 7-12% $Al_2O_3$, 34-43% CaO, 7-15% MgO, 0.2-1.6% $Fe_2O_3$, 0.15-0.76% MnO and 1.0-1.9% by weight. Furthermore, ultrafine blast furnace slag possesses an increased extent of self-cementing due to an increased specific surface area over conventional GGBFS. For example, MC-500® Microfine® Cement (de neef Construction Chemicals) is an ultrafine furnace slag with particle sizes less than about 10 m and specific surface area of about 800 $m^2$/kg. Recently, use of lignite and subbituminous coals has substantially increased and a significant percentage of the coal reserves in the US produce fly ash that contains considerable amounts of CaO. The fly ash containing high CaO contents (High-Ca FFA), e.g., greater than 8 wt. % and less than 20 wt. % may still be classified as type F according to ASTM C-618. These high-Ca FFA may also possess a certain degree of self-cementing property and the extent of self-cementing may increase with increasing CaO content. VCAS is a waste product of fiberglass production. VCAS is 100% amorphous and its composition is very consistent, mainly including about 50-55 wt. % $SiO_2$, 15-20 wt. % $Al_2O_3$, and 20-25 wt. % CaO. CKD is a by-product of the manufacture of Portland cement, and therefore an industrial waste. Over 30 million tons of CKD are produced worldwide annually, with significant amounts put into landfills. Typical CKD contains about 38-64 wt. % CaO, 9-16 wt. % $SiO_2$, 2.6-6.0 wt. % $Al_2O_3$, 1.0-4.0 wt. % $Fe_2O_3$, 0.0-3.2 wt. % MgO, 2.4-13 wt. % $K_2O$, 0.0-2.0 wt. % $Na_2O$. 1.6-18 wt. % $SO_3$, 0-5.3 wt. % $Cl^-$, and 5.0-25 wt. % is LOI. CKD is generally a very fine powder (e.g., about 4600-14000 $cm^2$/g specific surface area). CKD is similar to clinkers in Portland cement, possessing a self-cementing property. Therefore, these pozzolanic materials may be blended in activated CFA cementitious compositions in favor of low-$CO_2$ footprint and sustainability.

U.S. Pat. No. 4,997,484 discloses an alkali activated (silicate-free) Class C fly ash composition where hydraulic cement is formed from a Class C fly ash, an alkali metal activator and citric acid. The alkali metal activator includes alkali hydroxides and alkali carbonates. Borax ($Na_2O \cdot 2B_2O_3 \cdot 10H_2O$) is used as the set retarder and citric acid is a complexing agent for calcium cations released during the alkali activation of CFA. The workable time (set time) is usually less than 30 minutes. U.S. Pat. No. 5,435,843 discloses an alkali activated Class C fly ash composition where alkali hydroxide is added to achieve a pH of over 14.69. Because no suitable retarder is disclosed, the initial setting time of the cement is less than about 5 minutes, which renders these disclosed materials impossible to be used as construction and building materials. U.S. Pat. No. 5,997,632 discloses a blended hydraulic cement composition that is formed with subbituminous fly ash (e.g., CFA). The blended cement composition comprises gypsum, an alkali source, citric acid, CFA and a second material such as Portland cement, certain pozzolanic materials (e.g. lignite or bituminous fly ash, scrubber material). The alkali source includes potassium carbonate, lithium carbonate, and potassium hydroxide. Gypsum serves as the retarding agent. The hardened cement materials yield as high as 10,000 psi five days after final set. U.S. Pat. No. 6,482,258 disclosed CFA composition including alkali carbonates (lithium and potassium carbonates) as the alkali activator, borax, boric acid, citric acid and metakaolin as the retarding agents and an organic chelating agent. Both potassium carbonate and lithium carbonate are very expensive. The said retarding admixtures include borax, boric acid, citric acid or metakaolin.

U.S. Pat. No. 7,288,148 discloses hydraulic cement compositions containing a blend of CFA and a second fly ash containing high CaO and $SO_3$ contents. The fly ash concrete includes citric acid, potassium carbonate, and sodium citrate as accelerators and an alumina-bearing working aid (e.g., attapulgite, metakaolin, novaculite and bentonite). The setting time for the said cement is within 8 minutes after water is added. U.S. Pat. No. 7,854,803 discloses boro-citrate admixture (solution) for adjusting the set time of cementitious materials, e.g., Portland cement, Class C fly ash and blend hydraulic cement. Citric salts are the accelerator and boron compounds as the retarding agent. The ratio of citrate accelerator to boron retarding agent determines the set time for a cementitious material. The citrate accelerator further includes various alkali hydroxide and carbonate. U.S. Pat. No. 8,186,106 discloses CFA based cement, mortar and concrete compositions. The disclosed compositions include mainly four constituents, CFA, a second fly ash, an accelerator and a retarder. Citric salts are the accelerator forming a near neutral pH activator solution and boron compound the retarder. Due to inefficient retarding effect of boron compounds, the disclosed compositions exhibit fast setting and rapid strength gaining behaviors. Working time may be from about 20-40 minutes and a strength gain of 2500 psi in 2 hours from addition of water. Such a short workable time surely prevents the disclosed compositions from being used in ready mix applications. U.S. Pat. Nos. 8,617,308 and 9,0231,49 disclose CFA based cementitious mixtures for masonry products. Boron compounds (salt or acid) and tartaric acid are employed as the retarding agent. Though retarders are used, the set time as short as 16 minutes is disclosed. US pat. Appl. 2015/0007751 discloses a method for making a low-alkali fly ash cement which is an alkali-activated CFA composition. The alkaline activator is a low alkali solution (0.002 to 2 M) consisting of various hydroxides, carbonates, silicate, chlorides, and sulfates. The disclosed mixtures are extremely dry and require high-pressure compaction between about 17 MPa and 120 MPa to manufacture products. In order to improve the performance of the hardened products, high temperature curing is required. Set times of the mixtures are not disclosed and it is expected that the disclosed mixtures possess a fast setting behavior without use of an effective retarding agent. According to the present inventors, the CFA with 0.6 M NaOH sets in less than 10 minutes.

In summary, the prior art discloses CFA cementitious compositions essentially consisting of an alkali source, which is alkali hydroxide and alkali carbonate, a citric accelerator, and a retarding agent. The favorable alkali types are lithium and potassium. The citric accelerator includes citric acid, potassium citrate, and sodium citrate. The prior art discloses boron compounds, tartaric acid or gypsum as the retarding agent. Preferred boron compounds are borax and boric acid. The use of borates as retarders for Portland cement is well known. However, it has been reported that borates added to alkali-silicate activated CFA ash did not influence the setting behavior[8]; conversely, the strength of the binders was negatively affected by a high amount of borates. The retarding agents disclosed in the prior art are in general not effective in extending set time or workable time in the alkali silicate-free CFA cementitious mixtures. Most of the CFA cementitious compositions disclosed in the prior art exhibit fast setting and rapid gaining in strength, as in the cases of U.S. Pat. Nos. 4,997,484; 5,435,843; 7,288,148; 8,186,106; and 8,617,308. Due to extremely short set times, or very limited workable time, the CFA cementitious compositions disclosed in the prior art cannot be used in most construction and building applications such as ready mix concrete. Therefore, there is an immediate need for the development of an effective retarding agent for CFA based cementitious compositions to offset the accelerating effect of high ambient temperature (hot weather) and keep the concrete workable throughout the entire transport, placing and finishing periods.

Citric acid and salts of citric acid are the essential component in the CFA cementitious compositions disclosed in the prior art. It is well known that citric acid and salts of citric acid retard the hydration of Portland cement or its constituents. The effect of citric acid, and citrate respectively, has been investigated on Portland cement and showed by measuring heat evolution rates that the hydration of Portland cement is retarded.[9] It is proposed that potassium citrate is adsorbed on the clinker grain surface and forms a protective layer around the clinker grains and thus, retard the dissolution of the clinker phases.[10] The citrate ions are powerful chelators of $Ca^{2+}$ and $Al^{3+}$ that are released from early hydration of clinkers, leading to a reduction in nucleation and growth of calcium silicate hydrate or ettringite. At low dosages, i.e., less than 4% by weight of the binder (BWOB), citric salts act as retarders. However, at higher dosages, i.e. greater than about 5% up to about 8% BWOB the citric salts reverse their roles and act as accelerators for hydration of Portland cement (U.S. Pat. No. 5,634,972). It is expected that citric acid and citric salts act as the accelerator instead of the retarder as claimed in some earlier patent disclosures related to CFA, due to presence of highly alkaline activator solutions. With the citric salts and citric acid as the accelerator, the CFA based cementitious materials exhibit fast setting and rapid strength gaining with improved final strength. Now, it is easily understood that with including citric acid or citric salts as the accelerator, the effectiveness of boron compounds as the retarder becomes significantly lowered.

In addition, the CFA cementitious compositions disclosed in the prior art often employ expensive chemicals such as citric acid, citric salts, potassium hydroxide, lithium hydroxide and potassium carbonate, which render the cementitious materials less economically viable.

The present disclosure provides CFA cementitious compositions with well controlled setting times and improved performance over the materials disclosed in the prior art. The present disclosure provides inorganic compounds that are used to regulate the setting time of CFA-based cementitious materials while accelerating the strength development of the product. The present disclosure provides economically viable, high strength CFA cementitious compositions for ready mix, precast, and masonry in the construction and building industries.

Thus, one embodiment described herein provides high strength Class C fly ash cementitious compositions whose set times can be regulated in the range between 30 minutes and 12 hours. A Class C fly ash cementitious composition comprises: (i) at least one Class C fly ash; (ii) at least one activator solution comprising at least one alkali hydroxide and at least one alkali phosphate.

The activator solution is made by dissolving the at least one alkali hydroxide and the at least one alkali phosphate in water, wherein the at least one alkali hydroxide is selected from sodium hydroxide, potassium hydroxide, and lithium hydroxide and wherein the at least one alkali phosphate is selected from the group: trisodium phosphate (anhydrous and hydrates), disodium phosphate (anhydrous and hydrates) and monosodium phosphate, and their potassium equivalents.

In one embodiment, the at least one activator solution is mixed with CFA, aggregates and other ingredients or admixtures if any to manufacture mortar and concrete products.

In one embodiment the activator solution is made by dissolving sodium hydroxide and trisodium phosphate anhydrous in water.

In one embodiment, the activator solution comprises about 0.05% to about 10% BWOB of alkali hydroxide, about 0.05% to about 10% BWOB of alkali phosphate, and about 15 to 50% BWOB of water.

In one embodiment, the activator solution comprises about 0.5% to about 4% BWOB of sodium hydroxide, about 0.5% to 6% BWOB of trisodium phosphate anhydrous and about 20% to about 40% BWOB of water.

One embodiment provides CFA cementitious compositions including: (i) at least one Class C fly ash; (ii) at least one alkali hydroxide; (iii) at least one alkali carbonate; and (iv) at least one alkali phosphate, wherein the alkali carbonate is selected from the group: sodium carbonate, potassium carbonate, and sodium hydrogen carbonate; wherein the preferred alkali phosphate is trisodium phosphate anhydrous or dodecahydrate; wherein alkali hydroxide, triosodium phosphate, and alkali carbonate are dissolved in water to make the activator solution; and wherein the said activator solution is mixed with CFA, aggregates and other ingredients or admixtures if any to manufacture mortar and concrete products In one embodiment, the activator solution contains about 0.5% to about 2% BWOB of sodium hydroxide, about 0.25% to about 5% BWOB sodium carbonate anhydrous, about 2% to about 6% BWOB trisodium phosphate anhydrous, and about 20% to about 45% BWOB of water.

One embodiment provides solid activator/CFA cementitious compositions including: (i) at least one Class C fly ash; (ii) at least one alkali hydroxide solid; (iii) at least one alkali carbonate solid; and (iv) at least one alkali phosphate; and (v) water, wherein the alkali carbonate is selected from the group: sodium carbonate, potassium carbonate, and sodium hydrogen carbonate; wherein powdered alkali hydroxide, alkali phosphate and alkali carbonate solids are ground together with CFA to make the solid activator/CFA mixture; and wherein the said solid activator/CFA mixture is mixed further with aggregates and other ingredients if any and water to manufacture mortar or concrete products.

In one embodiment CFA cementitious compositions further comprise a second pozzolanic material, wherein the pozzolanic materials are selected from the group: high-Ca Class F fly ash, ground granulated blast furnace slag (BFS), superfine BFS, VCAS, and kiln dust.

The present disclosure provides Class C fly ash-based cementitious compositions with well controlled setting times and improved performance over the materials disclosed in the prior art. The present disclosure provides an inorganic admixture as the retarding agent to regulate the setting time and to serve the accelerator as well for the strength development. The present disclosure provides economically viable, CFA cementitious compositions for ready mix, precast, and masonry applications in the construction and building industries.

According to ASTM C618, Class F fly ash is normally produced by burning anthracite or bituminous coal and has pozzolanic properties. Pozzolanic materials are typically high in $SiO_2$ and $Al_2O_3$, and low in CaO; therefore, they have little or no reactivity when in contact with water. However, in the presence of water and $Ca(OH)_2$, pozzolans will chemically react to form compounds possessing cementitious properties, such as CSH and calcium aluminate hydrate (CAH). The Class F fly ash can be activated by alkali silicate solution to form geopolymers, featuring tetrahedral coordination of Si and Al atoms linked by oxygen bridges, with alkali metal cations (typically $Na^+$ and/or $K^+$) associated as charge balancers for $AlO_4^-$. Nominally, the empirical formula of geopolymers can be presented as $M_n[-(SiO_2)_z—AlO_2]_n \cdot wH_2O$ where M represents the alkalis cation, z is the molar ratio of Si to Al (1, 2 or 3), and n is the degree of polycondensation. Geopolymers are a class of alkali silicate-activated binders with a three-dimensional network structure similar to those of organic thermoset polymers. The backbone matrix of geopolymers is an X-ray amorphous analogue of the framework of zeolites, featuring tetrahedral coordination of Si and Al atoms linked by oxygen bridges, with alkali metal cations (typically $Na^+$ and/or $K^+$) associated as charge balancers for $AlO_4^-$. Class C fly ash is typically produced from burning lignite or subbituminous coal, and in addition to having pozzolanic properties, has some self-cementitious properties due to its high CaO content. The hydration products of Class C fly ash mainly consist of CSH, CASH, and certain minerals such as strätlingite, ettringite, and monosulfoaluminate.

As mentioned in the previous section, CFA cementitious compositions disclosed in the prior art consists of at least three essential components: an alkali source, which is alkali hydroxide and alkali carbonate, a citric accelerator, and a retarding agent. The citric accelerator includes citric acid, potassium citrate, and sodium citrate. The citric accelerator must be included in a cementitious composition in order to manufacture a hardened product with reasonably high strength. However, the citric accelerator accelerates not only the strength development process but also greatly fastens setting of the fresh cementitious paste. The retarding agents disclosed in the prior art such as borax and boric acid apparently are not efficient in extending the setting time in the presence of a citric accelerator. CFA cementitious compositions usually exhibit fast setting and rapid gain of strength, as disclosed in U.S. Pat. No. 4,997,484; 5,435,843; 7,288,148; 8,186,106; and 8,617,308. Due to extremely short set times, or very limited workable time, the CFA cementitious compositions disclosed in the prior art cannot be used in most of the construction and building applications.

Disclosed embodiments include developed new, citric-free, silicate-free CFA cementitious compositions with a well-controlled setting time and improved performance over the materials disclosed in the prior art. The present disclosure discovers that phosphates, such as alkali phosphates, possess a dual function by being an effective setting retarder and a strength accelerator. The present disclosure employs inexpensive ingredients and thus provides more economically viable cementitious compositions for the construction and building industries.

The present disclosure includes CFA cementitious compositions consisting of two essential components: An alkali source, which is alkali hydroxide and a source of phosphate. Though Class C fly ash exhibits self-cementing properties, hydration is generally slow at room temperature and thus the compressive strength of the hardened product is low. Alkali hydroxide either in solid form or in aqueous solution is needed to enhance hydration of CFA glass particles. CFA is essentially a calcium aluminosilicate glass. The fly ash glass network dissolves in an alkaline solution faster than in water of neutral pH and produces small reactive species of calcium, silicates, and aluminates. As the solution becomes more and more concentrated CSH, CAH and CASH gels form. A low concentration of alkali hydroxide should be applied. Higher concentrations of alkali hydroxide may accelerate setting beyond adequate control.

One embodiment described herein provides Class C fly ash cementitious compositions whose set times can be regulated in the range between 30 minutes and 12 hours. A Class C fly ash cementitious composition comprises: (i) at least one Class C fly ash and (ii) at least one activator solution comprising at least one alkali hydroxide, at least one source of phosphate, and water.

In one embodiment, the activator solution is made by dissolving at least one alkali hydroxide and at least one source of phosphate in water; where at least one alkali hydroxide is selected from sodium hydroxide, potassium hydroxide, and lithium hydroxide; and wherein the at least one source of phosphate comprises trisodium phosphate (anhydrous and hydrates), disodium phosphate (anhydrous and hydrates) and monosodium phosphate, and their equivalents of potassium, lithium, cesium, ammonium, aluminum, calcium, magnesium, or combinations thereof, and phosphoric acid.

In one embodiment, the source of phosphate is trisodium phosphate anhydrous or dodecahydrate and the alkali hydroxide is sodium hydroxide wherein sodium hydroxide and trisodium phosphate anhydrous are dissolved in water to form an activator solution.

In one embodiment, the CFA cementitious composition further comprise a second pozzolanic material that exhibit self-cementing properties. Examples of these pozzolanic materials include GGBFS, superfine BFS, VCAS and CKD. At least one second pozzolan may replace up to 40% of CFA.

In one embodiment, the at least one activator solution is mixed with CFA, aggregates and other ingredients if any to manufacture mortar and concrete products; where other ingredients comprise superplasticizer, shrinkage reducing admixture, and fibers.

In one embodiment, the activator solution comprise about 0.05% to about 8% BWOB of alkali hydroxide, about 0.25% to 8% BWOB of alkali phosphate anhydrous, and about 20% to about 50% BWOB of water. And in another embodiment, the activator solution comprises about 0.5% to about 4% BWOB sodium hydroxide, about 0.5% to 6% BWOB trisodium phosphate anhydrous, and about 15% to about 40% BWOB of water.

One embodiment provides a CFA cementitious composition including: (i) at least one Class C fly ash; (ii) at least one alkali hydroxide; (iii) at least one alkali carbonate; and (iv) at least one source of phosphate, wherein the alkali carbonate is selected from the group: sodium carbonate, potassium carbonate, and sodium bicarbonate; wherein the source of phosphate is trisodium phosphate anhydrous or dodecahydrate; wherein alkali hydroxide, trisodium phosphate, and alkali carbonate are dissolved in water to form an activator solution; and wherein the said activator solution is mixed with CFA, aggregates and other ingredients or admixtures if any to manufacture mortar and concrete products In one embodiment, the activator solution comprises about 0.1% to about 4% BWOB of alkali hydroxide, about 0.1% to about 5% BWOB of alkali carbonate, about 0.25% to about 4% BWOB of alkali phosphate anhydrous and about 15% to about 50% BWOB of water.

In one embodiment, the activator solution comprises about 0.25% to about 2% BWOB of sodium hydroxide, about 0.25% to about 4% BWOB of sodium carbonate, about 0.5% to about 6% BWOB of trisodium phosphate anhydrous, and about 20% to about 40% BWOB of water.

In one embodiment wherein a fresh mortar or concrete has a room temperature setting time of about 45 minutes to about 12 hours and wherein the hardened mortar or concrete has a 28-day compressive strength of at least about 4000 psi.

Disclosed embodiments have developed solid activator/binder compositions for mortar and concrete applications. The solid activator/binder mixture comprises at least one alkali hydroxide, at least one alkali carbonate, and at least one source of phosphate. The at least one alkali hydroxide is selected from sodium hydroxide, potassium hydroxide, lithium hydroxide, and calcium hydroxide; the at least one source of phosphate is selected from the group: trisodium phosphate (anhydrous and hydrates), disodium phosphate (anhydrous and hydrates) and monosodium phosphate, and their equivalents of potassium, lithium, cesium, ammonium, aluminum, calcium, magnesium, or combinations thereof, and phosphoric acid; and the at least one alkali carbonate is selected from the group: sodium carbonate, potassium carbonate, sodium bicarbonate and potassium bicarbonate; wherein the preferred alkali phosphate is trisodium phosphate anhydrous; wherein alkali hydroxide, trisodium phosphate, and alkali carbonate in the powdered form are mixed with at least one Class C fly ash to form a solid activator/binder mixture. Mixing by grinding the powdered raw materials together is preferred to manufacture a homogeneous, solid activator/binder mixture for packaging. The alkali hydroxide enhances dissolution and hydration of CFA glass particles; the phosphate regulates set time while enhancing strength development of the hardened product. Alkali hydroxide is hygroscopic. It will absorb water from the air when exposed and will react with the carbon dioxide in air to form sodium carbonate. Anhydrous forms of the above mentioned chemicals are preferred to avoid import of moisture into the solid activator/binder mixture. Sodium carbonate is a white, odorless powder that is hygroscopic as well. The sodium carbonate absorbed moisture does not lose its chemical function. Use of alkali carbonate will prevent alkali hydroxide from absorbing moisture from air, thus maintaining a longer shelf life of the solid activator for commercial viability. Dissolution of alkali carbonate will yield an alkaline solution that will enhance mildly dissolution and hydration of CFA glass particles.

One embodiment provides a solid activator/CFA mixture for mortar and concrete application, wherein the solid activator/CFA mixture comprises (i) at least one Class C fly ash; (ii) at least one alkali hydroxide solid; (iii) at least one alkali carbonate solid; and (iv) at least one source of phosphate solid, wherein alkali hydroxide, source of phosphate and alkali carbonate solids are mixed together with CFA to make a homogeneous solid activator/CFA mixture; wherein the solid activator/CFA mixture is then mixed with at least one aggregate and other ingredients if any and water to manufacture mortar and concrete products. In one embodiment wherein the at least one alkali hydroxide comprises about 0.05% to about 5% BWOB; at least one source of phosphate comprises about 0.25% to about 8% BWOB; wherein the at least one alkali carbonate comprises about 0.25% BWOB; and wherein water comprises about 15% to about 50% BWOB and more preferably about 20% to about 40% BWOB.

In one embodiment, the said solid activator/CFA mixture comprises sodium hydroxide, sodium carbonate anhydrous, trisodium phosphate anhydrous, and CFA.

In one embodiment, the said solid activator/CFA mixture comprises 0.25% to about 2% BWOB of sodium hydroxide, about 0.5% to about 4% BWOB of sodium carbonate anhydrous and about 0.5% to about 6% BWOB of trisodium phosphate anhydrous.

In one embodiment wherein a fresh mortar or concrete manufactured from a solid activator/CFA mixture has a room temperature setting time of about 45 minutes to about 12 hours and wherein the hardened mortar or concrete has a 28-day compressive strength of at least about 3000 psi.

In one embodiment CFA cementitious compositions further comprising a second pozzolanic material for mortar and concrete applications, wherein the solid activator/CFA mixture comprises (i) at least on class C fly ash, (ii) at least a second pozzolanic material, (iii) at least one alkali hydroxide, (iv) at least one alkali carbonate, and (v) at least on source of phosphate, wherein alkali hydroxide, source of phosphate, and alkali carbonate are in powder form and mixed together with CFA and a second pozzolanic material to make a homogeneous solid activator/binder mixture, wherein the solid activator/binder mixture is then mixed with at least one aggregate and other ingredients if any and water to manufacture mortar and concrete products.

Having described the many embodiments of the present disclosure in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

EXAMPLES

The following examples illustrate the practice of the present disclosure in its preferred embodiments.

The following raw materials were used to prepare samples in the examples. The fly ash was from Plant Scherer, Juliette, Ga., US, marketed by Boral Materials. This fly ash (Scherer fly ash) contained 26.5% wt. % CaO and had a Loss-On-Ignition (LOI) of 0.25%. Its sum of Si+Al+Fe oxides was about 59.08 wt. %, which fell between 50 and 70 wt. % for Class C Fly ash according to ASTM C618. 10.92 wt. % fly ash particles were retained on a No. 325 sieve.

Gravel #7 or #89 (AASHTO T-27) was used as coarse aggregate. To reach saturated surface dry (SSD) condition the dry gravel was immersed in water for 24 hours. The supernatant was discarded. The remaining free water was manually removed from the gravel surface using a dry cloth. Concrete sand in SSD condition was used. A Trident moisture probe (model T90) was used to determine the moisture content of a concrete sand sample.

Sodium hydroxide beads (NaOH, 99% purity), sodium carbonate anhydrous, trisodium phosphate anhydrous ($Na_3PO_4$), and trisodium phosphate dodecahydrate ($Na_3PO_4 \cdot 12H_2O$) were used to prepare an activator solution. General Description on Sample Preparation and Measurements NaOH beads (99% purity) if any were dissolved in water and the resulting solution was then combined with sodium carbonate, sodium phosphate anhydrous if any to prepare the activator solution. Prescribed amounts of fly ash and SSD concrete sand were premixed in a 7-quart planetary mixer. Then, the activator solution was poured into the fly ash/sand blend and mixed for 3 minutes. The batch size was about 3000 to 5000 grams. The fresh paste was immediately transferred into containers (7.6 cm diameter and 40 mm high), followed by treatment on a vibrating table for about 1 minute to remove entrapped air bubbles. The fresh mortar in the mentioned containers was used for initial and final set times according to ASTM C191 with a Vicatronic Automatic Vicat instrument, Model E004N (Matest, Italy), hereafter called AutoVicat. The remaining paste was poured into 2"×4" cylindrical plastic molds and vibrated for 3 minutes to remove entrapped bubbles. The molds with fresh mortar samples were capped and cured at room temperature (20 to 23° C.) until compressive strength was measured. Compressive strength tests were conducted using a CM-4000-SD compression machine (Test Mark Industries, USA) according to ASTM C39.

Examples 1 to 5

The Class C fly ash cementitious samples from Example #1 to #5 were prepared. The mortar mix compositions are shown in Table 1 and the ingredients are shown in BWOB. Mass ratios of water to binder (fly ash), w/b, define amounts of water needed to make an activator solution for a mortar paste with an appropriate consistency. SSD concrete sand was about 50% in a mortar mix composition for Examples #1 and #2. SSD sand was about 50% of the sum of the pure paste ingredients including fly ash, water, NaOH, $Na_3PO_4$, and $Na_2CO_3$ if any, for examples #3 to #5. All percentages are weight percent. The main purpose of these examples is to illustrate that a source of phosphate is the essential components to yield fresh fly ash concretes with a reasonably long set time for practical applications and to manufacture hardened products with significantly improved compressive strength.

TABLE 1

Fly ash mortar compositions and test results

| Example | BWOB | | | w/b | Initial set time | 28-day compressive strength (psi) |
| --- | --- | --- | --- | --- | --- | --- |
| | $Na_2CO_3$ | $Na_3PO_4$ | NaOH | | | |
| #1 | 3% | 3% | 0.75% | 0.35 | >4 hours | 8271 |
| #2 | 3% | 3% | 0.75% | 0.30 | >4 hours | 8760 |
| #3 | 3% | 3% | 0.75% | 0.32 | 372 minutes | 8535 |
| #4 | 3% | — | 0.75% | 0.32 | 11 minutes | 365 |
| #5 | — | 3% | 0.75% | 0.32 | 145 minutes | 7959 |

Example #1-3 used 3% BWOB of sodium carbonate and trisodium phosphate anhydrous respectively and 0.75% BWOB of sodium hydroxide with a w/b varied from 0.30 to 0.35. The compositions 1-3 have a set time over 4 hours and a compressive strength over 8000 psi after curing for 28 days at room temperature. The initial set time of Example 3 with w/b=0.32 was 372 minutes or 6.2 hours.

Trisodium phosphate anhydrous was deleted from Example 3 to make Example 4. The initial set time sharply decreased to 11 minutes as compared to 372 minutes for Example 3 that employed 3% BWOB of trisodium phosphate anhydrous. Without use of trisodium phosphate anhydrous, the compressive strength of Example 4 was merely 365 psi as compared to 8535 psi for Example 3. There were visible voids in the samples of #4, due to fast setting. Apparently, the presence of phosphate is essential to a fly ash concrete mix to extend the set time significantly and to achieve high mechanical performance.

Sodium carbonate anhydrous was deleted from Example 3, to make Example 5. The initial set time was 145 minutes. The compressive strength was 7959 psi after curing for 28 days at room temperature. Removal of sodium carbonate did not affect compressive strength of the hardened product.

Examples 6 to 11

TABLE 2

Fly ash mortar compositions and test results for examples 6 to 11

| Example | BWOB | | | w/b | Initial set time (minutes) | 28-day compressive strength (psi) |
| --- | --- | --- | --- | --- | --- | --- |
| | $Na_2CO_3$ | $Na_3PO_4$ | NaOH | | | |
| #6 | — | — | — | 0.32 | 5 | 4082 |
| #7 | — | — | 2% | 0.32 | 27 | 2038 |
| #8 | — | 2% | 2% | 0.32 | 60 | 7365 |

TABLE 2-continued

Fly ash mortar compositions and test results for examples 6 to 11

| | BWOB | | | | Initial set time | 28-day compressive |
|---|---|---|---|---|---|---|
| Example | $Na_2CO_3$ | $Na_3PO_4$ | NaOH | w/b | (minutes) | strength (psi) |
| #9 | — | 4% | 2% | 0.32 | 128 | 8691 |
| #10 | 2% | 2% | 2% | 0.32 | 31 | 7507 |
| #11 | 2% | — | 2% | 0.32 | <10 | 4642 |

The fly ash mortar compositions for Example 6 to 11 are shown in Table 2 and the ingredients are prescribed in BWOB. NaOH was fixed at 2% BWOB and w/b was fixed at 0.32. Again, SSD concrete sand was about 50 wt. % of the sum of the pure paste ingredients. The main purpose of these examples is to illustrate that a source of phosphate is the only essential component to yield a fresh fly ash concrete with a reasonably long set time for practical applications and to manufacture a hardened product with significantly improved compressive strength.

Example 6 represents a plain fly ash paste sample without any additives such as sodium carbonate, trisodium phosphate anhydrous. The fresh sample exhibited flash setting, i.e., it set in 5 minutes. The compressive strength was 4082 psi after curing for 28 days at room temperatures. The result is consistent with the literature or the prior art.[7]

Example 7 represents a fly ash composition activated by alkali hydroxide without amending sodium carbonate and trisodium phosphate anhydrous. The fresh mortar sample set in 27 minutes. The compressive strength was only 2038 psi after curing for 28 days at room temperature. Addition of sodium hydroxide does not improve the product's performance compared to Example 6.

Addition of 2% BWOB of trisodium phosphate anhydrous to the mix of Example 7 yielded the fly ash composition of Example 8. The set time of the resulting fresh mortar increased to 60 minutes. The compressive strength increased to 7365 psi after curing 28 days at room temperature, significantly higher than the strength of Example 7 where no trisodium phosphate was added. Trisodium phosphate anhydrous was further increased to 4% BWOB in Example 9. The set time doubled to 128 minutes and the compressive strength increased to 8691 psi after curing 28 days at room temperature, suggesting that addition of phosphate not only extends the set time of the fresh concrete, it also improves the performance of the hardened product.

Addition of 2% BWOB of sodium carbonate anhydrous to the composition of Example 8 yielded the composition of Example 10. The set time of the fresh mortar was decreased to 31 minutes. The compressive strength was 7507 psi after curing 28 days at room temperature. A second test was conducted with the same formulation and the same raw materials. The compressive strength was 7642 psi after curing 28 days at room temperature. Addition of sodium carbonate shortens the set time. Dissolution of sodium carbonate leads a more alkaline solution causing accelerated setting. Compressive strength was comparable to that of Example 8 where no sodium carbonate anhydrous was amended, suggesting that further inclusion of alkali carbonate does not improve further the mechanical properties of the hardened product.

Trisodium phosphate anhydrous was deleted from the fly ash mixture of Example 10 to obtain Example 11. The initial set time sharply decreased to a few minutes, i.e., flash setting was observed. The compressive strength of Example 11 was merely 4642 psi, reduced from 7507 psi of Example 10. Apparently, the presence of phosphate is essential to yield a fly ash concrete mix with greatly extended set time and significantly improved mechanical performance. Inclusion of sodium carbonate significantly accelerates setting of a fresh mortar sample and yields a hardened product with significantly lowered compressive strength as compared to the fly ash compositions with phosphate.

Example 12

The fly ash mortar composition of Example 12 was the same as in Example 5 (Table 1) where 3% BWOB of trisodium phosphate anhydrate, 0.75% BWOB sodium hydroxide and w/b of 0.32 were employed, except that in Example 12 a second pozzolanic material was included. The second pozzolanic material was a high-Ca FFA containing 12.2 wt. % CaO, from Jewett Power Plant, TX, USA. Again, SSD concrete sand was used, at about 50% of the sum of the pure paste ingredients. The main purpose of this example was to illustrate that addition of a second pozzolanic material into a Class C fly ash mix composition would still yield a fresh concrete with a reasonable set time and a hardened product with still significantly improved compressive strength. 20 wt. % CFA was replaced with the high-Ca FFA. The set time was 153 minutes per ASTM C191 and the compressive strength was 5528 psi after curing for 28 days. Apparently, the high-Ca FFA ash is not as reactive as Class C fly ash and therefore, the product's compressive strength was lowered compared to Example 5. It is expected that using a second pozzolanic material with a reactivity similar to Class C fly ash, such as ground blast furnace slag or cement kiln dust would yield a hardened product with comparable performance to the concrete made with 100% Class C fly ash.

Examples 13 to 18

The fly ash concrete compositions of Example 13 to 18 are shown in Table 3 and the ingredients are shown in BWOB. NaOH was fixed at 2% BWOB. SSD concrete sand and gravel (Grade #7 or #89 per AASHTO T-27) were used as aggregates. The main purpose of these examples is to illustrate that only inclusion of a source of phosphate in a fly ash concrete mix yields a fresh concrete with a reasonably long set time and a hardened product with high compressive strength.

To prepare fly ash concrete samples as a 12 kg batch, sodium hydroxide, trisodium phosphate dodecahydrate instead of anhydrous, and sodium carbonate if any were dissolved in tap water to prepare the activator solution. Then the activator solution was mixed with the mixture of fly ash and SSD sand in a 20 L K-Lab intensive mixer (Kercher Industries, PA, USA) for 3 minutes at an immediate speed. SSD gravel was then poured into the mixture and mixed at a low speed for another 3 minutes. The setting time for the fresh concrete was estimated. The fresh concrete was placed into 3"×6" plastic molds compacted with a hydraulic press at a total force of about 1000 lbs (Examples 14 to 16) or compacted by vibration (Examples 17 and 18). The samples were sealed and cured at room temperature until compressive strength was measured on a CM-4000-SD compression machine (Test Mark Industries, USA).

TABLE 3

Fly ash concrete compositions and test results

| | BWOB | | | | Total | | Compressive Strength (psi) | | |
|---|---|---|---|---|---|---|---|---|---|
| Example | $Na_2CO_3$ | $Na_3PO_4$* | NaOH | w/b | aggregate | Set time | 7-day | 14-day | 28-day |
| #13 | 2% | 3% | 2% | 0.25 | 78.8% | ND | ND | ND | 6819 |
| #14 | 2% | 2% | 2% | 0.28 | 81.5% | >1 h | 1001 | 3101 | 4034 |
| #15 | — | 3% | 2% | 0.28 | 81.5% | >3 h | 3646 | 4721 | 6289 |
| #16 | 2% | — | 2% | 0.28 | 81.5% | <0.5 h | 80 | 92 | 265 |
| #17 | — | 3% | 2% | 0.32 | 77.8% | >2 h | 3771 | 5001 | 6366 |
| #18 | 2% | — | 2% | 0.32 | 77.8% | <0.5 h | 296 | 480 | 2293 |

ND = not determined
*as trisodium phosphate dodecahydrate, equivalent to 43.1% anhydrous phase.

The fresh concrete for Example 13 was fairly dry due to its extremely low w/b. After curing for 28 days at room temperature, the compressive strength was 6819 psi. Trisodium phosphate dodecahydrate was used when the samples for Examples 13-18 were prepared, which was equivalent to only 0.9% BWOB of trisodium phosphate anhydrous. When trisodium phosphate anhydrous was increased to 2% BWOB, 28-day compressive strength is expected to increase, as demonstrated in the mortar samples (Tables 1 and 2).

The fly ash concrete compositions for Examples 14 to 16 are shown in Table 3. NaOH was fixed at 2% BWOB, w/b was fixed at 0.28 and total aggregate at 81.5 wt. %. The setting time for Example 14 was estimated to be greater than 1 hour and the compressive strength was 4034 psi after curing for 28 days at room temperature. In Example 15, the 2% BOWB of sodium carbonate in Example 14 was not used. Instead trisodium phosphate dodecahydrate was increased to 3% BWOB. The setting time was greater than 3 hours and the compressive strength was 6289 psi after curing for 28 days. No trisodium phosphate dodecahydrate was used when preparing the mix for Example 16. Without phosphate, the setting time decreased significantly to less than 0.5 hours and the compressive strength was merely 265 psi after curing for 28 days at room temperature. This set of examples demonstrates that phosphate is critical to manufacture fly ash concretes with a reasonably long set time and improved compressive strength.

Sodium hydroxide was fixed at 2% BWOB, w/b at 0.32 and total aggregate at 77.8 wt. %, in the concrete mix compositions of Examples 17 and 18. Again, without incorporating trisodium phosphate dodecahydrate in Example 17, the setting time of the fresh concrete was less than 0.5 hours. Flash setting was observed. The compressive strength was merely 480 psi after curing for 28 days at room temperature. In contrast, including 3% BWOB of trisodium phosphate dodecahydrate in Example 18 increased the setting time to greater than 2 hours and the compressive strength increased to 6366 psi after curing for 28 days at room temperature. With incorporating a source of phosphate, the hardened products usually exhibit a higher early strength as well, as shown in Examples 15 and 17.

In summary, without including a source of phosphate in a fly ash concrete mix composition, the fresh concrete usually exhibits a very short workable time and a hardened product with an inferior mechanical performance. Phosphate is an effective retarder and a great strength enhancer as well. Most of the retarders disclosed in the prior art may extend setting time of a fresh concrete but usually reduce compressive strength of the hardened product, therefore an additional accelerator such as citric acid or salts are necessary in the prior art.

Example 12

The objective of Example 19 was to demonstrate the feasibility to manufacture fly ash C concrete with a solid activator. The mortar composition of Example 3 was used. The mortar composition employed 3% BWOB of both sodium carbonate and trisodium phosphate anhydrous. Sodium hydroxide was 0.75% BWOB and w/b was 0.32. 50 wt. % SSD sand as of the sum of the pure paste ingredients was used. The powdered sodium hydroxide, sodium carbonate and trisodium phosphate anhydrous materials were mixed and then combined with SSD sand. Finally, tap water was poured into the dry mixture and was mixed in a 7 Quart planetary mixer for 6 minutes. The set time was determined on an AutoVicat instrument according ASTM C191. The setting time was over 183 minutes and the compressive strength was 8237 psi after curing for 28 days at room temperature. This example demonstrates that using a solid activator/binder mixture yields a fresh and hardened product that has a comparable performance to the mix that uses a liquid activator.

REFERENCES

The following references are referred to above and are incorporated herein by reference:
1. J. L. Provis, J. S. J. van Deventer, Alkali Activated Materials; Springer: Houten, The Netherlands, (2014).
2. A. M. Rashad, A comprehensive overview about the influence of different admixtures and additives on the properties of alkali-activated fly ash, Mater. Design 53 (2014), 1005-1025
3. J. L. Provis and S. A. Bernal, Geopolymers and related alkali-activated materials, Annu. Rev. Mater. Res. 44 (2014), 299-327.
4. E. I. Diaz, E. N. Allouche, S. Eklund, Factors affecting the suitability of fly ash as source material for geopolymers, Fuel 89 (2010), 992-999.
5. E. I. Diaz-Loya, E. N. Allouche, and S. Vaidya, Mechanical properties of fly-ash-based geopolymer concrete, ACI Mater. J. 108 (2011), 300-306.
6. M. Berry, J. Stephens, D. Cross, Performance of 100% fly ash concrete with recycled glass aggregate, ACI Mater. J. 108 (2011), 378-384.
7. C. Roskos, D. Cross, M. Berry, J. Stephens, Identification and verification of self-cementing fly ash binders for 'Green' concrete (2011 World of Coal Ash (WOCA) Conference, May 9-12, 2011 in Denver, Colo., USA).
8. C. L. Nicholson, B. J. Murray, R. A. Fletcher, D. Brew, K. J. Mackenzie, M. Schmücke, Novel geopolymer materials containing borate structural units. In Proceedings of the World Congress Geopolymer, Perth, Australia, September (2005), 31-33.
9. V. S. Ramachandran, M. S. Lowery, Conduction calorimetric investigation of the effect of retarders on the hydration of Portland cement, Thermochim. Acta 195 (1992) 373-387.
10. G. Möschner, B. Lothenbach, R. Figi, R. Kretzschmar, Influence of citric acid on the hydration of Portland cement, Cem. Concr. Res. 39 (2009), 227-282.

All documents, patents, journal articles and other materials cited in the present application are incorporated herein by reference.

While the present disclosure has been disclosed with references to certain embodiments, numerous modification, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What is claimed is:

1. A Class C fly ash (CFA) cementitious composition with a controllable setting time consisting essentially of:
   at least one Class C fly ash;
   at least one alkali hydroxide;
   a setting retarder and a strength accelerator comprising at least one source of phosphate; and
   water.

2. The composition of claim 1, wherein the at least one alkali hydroxide comprises sodium hydroxide, potassium hydroxide, lithium hydroxide, calcium hydroxide or combination thereof.

3. The composition of claim 1, wherein the at least one source of phosphate comprises trisodium phosphate (anhydrous and hydrates), disodium phosphate (anhydrous and hydrates) and monosodium phosphate, and their equivalents of potassium, lithium, cesium, ammonium, aluminum, calcium, magnesium, or combinations thereof, and phosphoric acid.

4. The composition of claim 1, wherein the at least one alkali hydroxide is sodium hydroxide and wherein the at least one source of phosphate is trisodium phosphate anhydrous or hydrates.

5. The composition of claim 1, wherein the at least one alkali hydroxide, and the at least one source of phosphate are dissolved in water to form an activator solution.

6. The composition of claim 1, wherein the at least one alkali hydroxide comprises about 0.01% to about 10% by weight of binder (BWOB), wherein the at least one source of phosphate comprises about 0.05% to about 10% BWOB, and wherein water comprises about 15% to about 50% BWOB.

7. A mortar or concrete comprising the composition of claim 5, other ingredient or admixture, and at least one aggregate.

8. A fly ash mortar or concrete made by mixing a Class C fly ash (CFA) cementitious composition with a controllable setting time consisting essentially of:
   at least one Class C fly ash;
   at least one alkali hydroxide;
   a setting retarder and a strength accelerator comprising at least one source of phosphate;
   a second pozzolanic material and
   water,
   wherein the pozzolanic material is selected from the group: Class F fly ash, ground granulated blast furnace slag, superfine blast furnace slag, vitreous calcium aluminosilicate, cement kiln dust, and combinations thereof, wherein the second pozzolanic material replaces the Class C fly ash for up to 40 wt. %, wherein the at least one alkali hydroxide, the at least one source of phosphate and the at least one alkali salt are dissolved in water to form an activator solution.

9. The fly ash mortar or concrete of claim 8, wherein the mortar or concrete has a room temperature setting time of about 45 minutes to about 12 hours.

10. The fly ash mortar or concrete of claim 8, wherein the mortar or concrete has a 28-day compressive strength of at least about 4000 psi.

11. A Class C fly ash (CFA) cementitious composition with a solid activator consisting essentially of:
   at least one Class C fly ash;
   at least one alkali carbonate;
   at least one alkali hydroxide;
   a setting retarder and a strength accelerator comprising at least one source of phosphate; and
   water.

12. The composition of claim 11, wherein the at least one source of phosphate comprises trisodium phosphate (anhydrous and hydrates), disodium phosphate (anhydrous and hydrates) and monosodium phosphate, and their equivalents of potassium, lithium, cesium, ammonium, aluminum, calcium, magnesium, or combinations thereof, and phosphoric acid.

13. The composition of claim 11, wherein the at least one alkali carbonate is selected from the group: sodium carbonate, potassium carbonate, sodium bicarbonate, potassium bicarbonate, and combination thereof.

14. The composition of claim 11, wherein the at least one alkali carbonate comprises about 0.01% to about 10% BWOB; at least one source of phosphate comprises about 0.05% to about 10% BWOB; wherein the at least one alkali carbonate comprises about 0.5% to about 5% BWOB; and wherein water comprises about 15% to about 50% BWOB.

15. The composition of claim 11, wherein sodium hydroxide, trisodium phosphate anhydrous, and sodium carbonate are mixed with the CFA to form a solid activator/CFA mixture.

16. A mortar or concrete comprising the composition of claim 15, other ingredient or admixture, and at least one aggregate.

17. The fly ash mortar or concrete of claim 16, wherein the mortar or concrete has a room temperature setting time of about 45 minutes to about 12 hours.

18. The fly ash mortar or concrete of claim 16, wherein the mortar or concrete has a 28-day compressive strength of at least about 3000 psi.

19. A Class C fly ash (CFA) cementitious composition with a controllable setting time comprising:
   at least one Class C fly ash;
   at least one alkali hydroxide;
   a setting retarder and a strength accelerator comprising at least one source of phosphate; and water,
   wherein the mortar or concrete has a 28-day compressive strength of at least about 10,000 psi.

20. The composition of claim 19, wherein the cementitious composition further comprises: at least one soluble alkali salt and wherein the alkali salt is selected from the group: sodium carbonate, potassium carbonate, sodium bicarbonate, potassium bicarbonate, sodium sulfate, potassium sulfate, or combination thereof.

21. The composition of claim 20, wherein the at least one alkali salt comprises sodium carbonate.

22. The composition of claim 20, wherein the at least one alkali salt comprises up to 10% by weight of binder (BWOB).

23. The composition of claim 19 wherein, the CFA cementitious composition further comprises a second pozzolanic material, wherein the pozzolanic material is selected from the group: Class F fly ash, ground granulated blast furnace slag, superfine blast furnace slag, vitreous calcium aluminosilicate, cement kiln dust, and combinations thereof, wherein the second pozzolanic material replaces the Class C fly ash for up to 40 wt. %.

24. A Class C fly ash (CFA) cementitious composition with a solid activator comprising:
   at least one Class C fly ash;
   at least one alkali carbonate;
   a setting retarder and a strength accelerator comprising at least one source of phosphate; and
   water,
   wherein the mortar or concrete has a 28-day compressive strength of at least about 10,000 psi.

\* \* \* \* \*